United States Patent [19]

Nakanishi et al.

[11] Patent Number: 4,715,664

[45] Date of Patent: Dec. 29, 1987

[54] HYDRAULIC ANTI-SKID BRAKE SYSTEM WITH DEVICE FOR IMPROVEMENT IN STRAIGHT-LINE RUNNING STABILITY OF VEHICLE

[75] Inventors: Nobuyasu Nakanishi; Masakazu Ishikawa, both of Toyota; Akira Shirai, Toyoake; Noboru Noguchi, Toyota, all of Japan

[73] Assignee: Toyota Jidosha Kabushiki Kaisha, Japan

[21] Appl. No.: 841,783

[22] Filed: Mar. 20, 1986

[30] Foreign Application Priority Data

Mar. 23, 1985 [JP] Japan ................................ 60-59074

[51] Int. Cl.[4] ........................................ B60T 8/42
[52] U.S. Cl. ............................ 303/111; 188/181 A; 303/110; 303/115; 303/116; 303/119
[58] Field of Search .............................. 303/113–119, 303/61–63, 68–69, 91, 92, 111, 96, 110, 6 R, 6 A, 10–12, 103; 188/181; 364/426

[56] References Cited

U.S. PATENT DOCUMENTS

| | | | |
|---|---|---|---|
| 3,550,966 | 12/1970 | Leiber | 303/119 |
| 3,840,278 | 10/1974 | Fleischer et al. | 303/111 |
| 3,927,914 | 12/1975 | Fink et al. | 303/115 |
| 4,036,534 | 7/1977 | Kondo et al. | 303/115 X |
| 4,095,848 | 6/1978 | Kondo | 303/116 X |
| 4,374,421 | 2/1983 | Leiber | 303/111 X |
| 4,395,073 | 7/1983 | Arikawa et al. | 303/116 |
| 4,453,782 | 6/1984 | Arikawa et al. | 303/119 X |
| 4,602,824 | 7/1986 | Nishimura et al. | 303/116 X |
| 4,603,920 | 8/1986 | Otsuki et al. | 303/116 X |

FOREIGN PATENT DOCUMENTS

| | | |
|---|---|---|
| 57-80956 | 5/1982 | Japan. |
| 58-26659 | 2/1983 | Japan. |
| 0033157 | 2/1985 | Japan ................ 303/116 |

Primary Examiner—Douglas C. Butler
Attorney, Agent, or Firm—Parkhurst & Oliff

[57] ABSTRACT

A hydraulic brake system wherein braking pressures in respective right and left brake cylinders for a right and a left wheel of a motor vehicle are regulated independently of each other by respective anti-skid devices. The brake system includes a first and a second flow restrictor device which are respectively provided in mutually independent passages leading to the brake cylinders, the first and second flow restrictors being electrically controlled by a control device independently of each other so as to restrict flows of a brake fluid through the flow restrictor devices, respectively. The control device activates one of the flow restrictor devices corresponding to one of the brake cylinders, after the anti-skid device for the other brake cylinder is activated to start an anti-skid control of the braking pressure in the other brake cylinder, thereby reducing a rate of increase in the braking pressure in the above-indicated one brake cylinder after the anti-skid control of the braking pressure in the other brake cylinder is started.

9 Claims, 11 Drawing Figures

HYDRAULIC ANTI-SKID BRAKE SYSTEM WITH DEVICE FOR IMPROVEMENT IN STRAIGHT-LINE RUNNING STABILITY OF VEHICLE

BACKGROUND OF THE INVENTION

1. Field of the Art

The present invention relates in general to a hydraulically-operated anti-skid brake system for a motor vehicle, and more particularly to improvements in consistency of braking effect of right and left wheel brake cylinders upon anti-skid brake application while right and left wheels are running on road surfaces of different conditions.

2. Related Art Statement

Such an anti-skid brake system uses, for example, an anti-skid device of a so-called closed-circuit type or variable-volume type as disclosed in Japanese Patent Application which was laid open under Publication No. 58-26659, or an anti-skid device of a so-called recirculating type as disclosed in Japanese Patent Application which was laid open under Publication No. 57-80956. In the closed-circuit type, a variable-volume chamber is provided in communication with a part of the fluid passage which communicates with a wheel brake cylinder, but is disconnected from a master cylinder of the brake system upon activation of the anti-skid device. The pressure in the above-indicated part of the fluid passage is regulated by changing the volume of the variable-volume chamber by an actuator. This actuator is operated by a pressure generated by a hydraulic pump, a vacuum pump or other pressure source provided independently of the master cylinder. In the recirculating type, the brake fluid is discharged from a wheel brake cylinder to lower the pressure in the brake cylinder upon an excessive rise in the braking pressure therein, and the discharged fluid is pressurized to a higher level of pressure by a pump. The thus reserved pressurized brake fluid is recirculated into the brake wheel cylinder when it becomes necessary to raise the braking pressure in that brake cylinder. In either one of the above two different types, solenoid-operated control valves are generally provided for the right and left wheel cylinders, and are controlled independently of each other by a main controller whose major part consists of a computer. For example, the main controller is adapted to receive signals from slip sensors which detect slippage of the right and left wheels of the vehicle on the road surfaces. Based on these signals, the main controller controls the solenoid-operated control valves so as to hold the slip ratios of the right and left wheels within an optimum range.

3. Problem solved by the invention

However, the hydraulic brake system equipped with an anti-skid device indicated above suffers from a problem of reduced straight-line running stability of the vehicle in the event that relatively high braking pressures are applied to the brake cylinders while the right and left wheels are running on road surfaces having different coefficients of friction. Described more specifically, the solenoid-operated control valve corresponding to the wheel running on the road surface with a comparatively low coefficient of friction starts an anti-skid control of the braking pressure in the corresponding brake cylinder, at an earlier timing than the other control valve, so as to hold the braking pressure in that brake cylinder at a comparatively low level. On the other hand, the other control valve corresponding to the other wheel running on the road surface with a higher coefficient of friction is left in its non-operated position, allowing the braking pressure in the corresponding brake cylinder to be raised at a higher rate. As a result, the right and left brake cylinders have different braking effects on the corresponding wheels of the vehicle, whereby the straight line stability of the vehicle is reduced.

SUMMARY OF THE INVENTION

It is therefore an object of the present invention to provide a hydraulic anti-skid brake system for a motor vehicle, which assures the vehicle of improved straight line running stability even when a large braking force is applied to a brake pedal while the corresponding right and left wheels of the vehicle are running on road surfaces having different coefficients of friction.

According to the invention, there is provided a hydraulic brake system wherein braking pressures in respective right and left brake cylinders for a right and a left wheel of a motor vehicle are regulated independently of each other by respective anti-skid devices, comprising: first and second flow restrictor devices which are respectively provided in a first and a second passage leading to the right and left brake cylinders, the first and second flow restrictors being electrically controlled independently of each other so as to restrict the flow of a brake fluid through the first and second flow restrictor devices, respectively; and a control device electrically connected to the first and second flow restrictor devices. The control device is adapted to activate one of the first and second flow restrictor devices corresponding to one of the right and left brake cylinders, after the anti-skid device for the other brake cylinder is activated to start an anti-skid control of the braking pressure in the other brake cylinder, thereby reducing a rate of increase in the braking pressure in the above-indicated one brake cylinder after the anti-skid control of the braking pressure in the other brake cylinder is started.

When high braking pressures are applied to the brake cylinders of the hydraulic anti-skid brake system of the present invention while the corresponding right and left wheels are running on road surfaces of different coefficients of friction, the braking pressure in the brake cylinder for the wheel running on the road surface with a comparatively low coefficient of friction is held comparatively low, while the rise in the braking pressure in the other brake cylinder for the other wheel running on the road surface with a higher coefficient of friction is restricted to a lower rate than in the conventional anti-skid brake system. This restriction of rise in the braking pressure in the other brake cylinder is attained by restricting the flow of the brake fluid toward that brake cylinder by means of activation of the flow restrictor device corresponding to the wheel running on the road surface with the low coefficient of friction.

As is apparent from the foregoing description, the rate of increase in the brake cylinder for the wheel on the road surface having a comparatively high coefficient of friction is restricted after the start of the anti-skid control of the braking pressure in the other brake cylinder for the wheel on the road surface with a comparatively low coefficient of friction. Consequently, the reduction in the straight line stability of the vehicle due to the anti-skid control of only one of the brake cylinders is restrained, so as to allow the operator of the vehicle to recover the stability, thus increasing the controllability of the vehicle.

According to one embodiment of the invention, the control device restores the activated one of the flow restrictor devices to its non-activated position when the corresponding anti-skid device for the above-indicated one brake cylinder is activated to effect an anti-skid control of the braking pressure in the above one brake cylinder.

According to another embodiment of the invention, the control devices restores the activated flow restrictor device to its non-activated position when the anti-skid control of the braking pressure in the above-indicated other brake cylinder is terminated.

According to a further embodiment of the invention, the control device restores the activated flow restrictor device to its non-activated position when a predetermined time has lapsed after the anti-skid control of the braking pressure in the above-indicated other brake cylinder is started. Since the reduction in the straight line stability of the vehicle is particularly remarkable for an initial time period after the start of an anti-skid control of the braking pressure in one of the brake cylinders, it is sufficient that the appropriate flow restrictor device is held activated for a predetermined suitable length of time following the start of the anti-skid control.

According to a still further embodiment of the invention, the control device simultaneously activates both the first and second flow restrictor devices when the anti-skid control of the braking pressure in the other brake cylinder is started.

In accordance with a yet further embodiment of the invention, each of the first and second flow restrictor device comprises restrictor valve means having a non-restricting position in which the flow of the brake fluid through the corresponding one of the first and second passages is not restricted, and a restricting position in which the flow is restricted. The restrictor valve means is normally held in the non-restricting position by the control device.

In one form of the above embodiment, each of the anti-skid devices is of a closed-circuit type in which a pressure in a part of the corresponding one of the first and second passages is regulated by an actuator which is operated by a pressure generated by a source independent of the master cylinder. The above-indicated part is disconnected from a master cylinder of the brake system, but communicates with one of the brake cylinders corresponding to the above-indicated one of the first and second passages. The actuator controls a volume of a variable-volume chamber communicating with the part of the above-indicated one passage, thereby regulating the pressure in the part of the above one passage.

In another form of the above embodiment, each of the anti-skid devices is of a recirculating type in which the brake fluid is discharged from the above-indicated one brake cylinder to lower the braking pressure therein upon an excessive rise in the braking pressure in the above one brake cylinder, and the discharged brake fluid being pressurized to a higher level of pressure by a pump. The pressurized brake fluid is recirculated into the above one brake cylinder when it becomes necessary to raise the braking pressure in the above one brake cylinder.

In a further form of the above embodiment, the restrictor valve means is a solenoid-operated valve which is operable between the non-restricting and restricting positions under the control of the control device.

In a still further form of the above embodiment, the restrictor valve means includes a solenoid-operated shut-off valve operable between a closed and an open position under the control of the control device, and further includes a restrictor connected in parallel to the solenoid-operated shut-off valve. The flow of the brake fluid through the above-indicated one of the first and second passages is restricted by the restrictor when the shut-off valve is placed in the closed position.

In a yet further form of the same embodiment, the restrictor valve means is a solenoid-operated shut-off valve operable between a closed and an open position, the control device normally holding the shut-off valve in the open position, but applying current pulses to the shut-off valve to bring the shut-off valve alternately into the open and closed positions, thereby restricting the flow of the brake fluid through the above-indicated one of the first and second passages, when the anti-skid device for the above-indicated other brake cylinder is activated to start the anti-skid control of the braking pressure in the that other brake cylinder.

According to yet another embodiment of the invention, the anti-skid devices respectively comprise a first and a second solenoid-operated pressure regulating vale for controlling the braking pressures in the right and left brake cylinders, respectively, independently of each other, and further comprise a main controller for controlling the first and second solenoid-operated pressure regulating valves. The main controller operates one of the first and second solenoid-controlled pressure regulating valves, so as to restrict the flow of the brake fluid through one of the first and second passages corresponding to the above-indicated one brake cylinder, while operating the other solenoid-operated pressure regulating valve corresponding to the other brake cylinder, so as to start the anti-skid control of the braking pressure in the above-indicated other brake cylinder. In this embodiment, the first and second solenoid-operated pressure regulating valves function as the first and second flow restrictor devices, respectively, while the main controller functions as the control device. The instant embodiment is therefore advantageous in terms of cost of manufacture of the brake system.

BRIEF SUMMARY OF THE INVENTION

The foregoing and other objects, features and advantages of the present invention will be better understood by reading the following detailed description of preferred embodiments of the invention, when considered in conjunction with the accompanying drawings, in which.

DETAILED DESCRIPTION OF THE PREFERRED EMBODIMENTS

Figure 1:
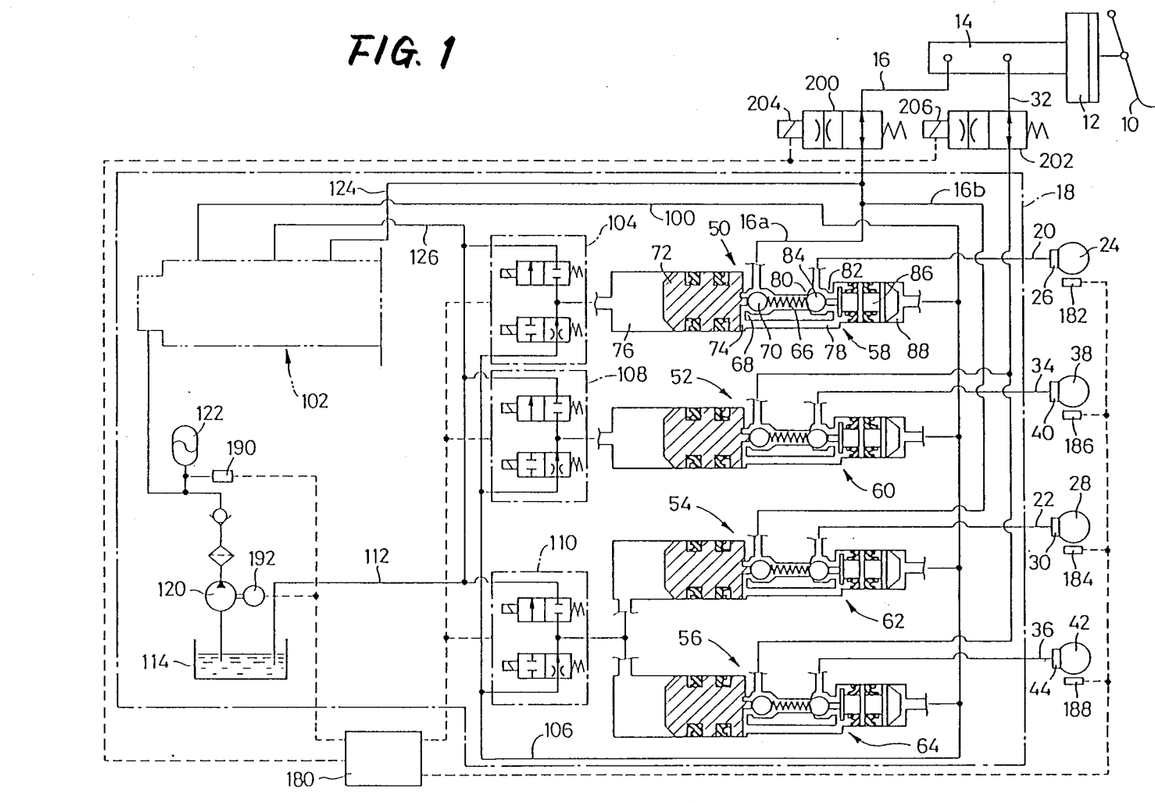
FIG. 1 is a diagram illustrating one embodiment of a hydraulically-operated anti-skid brake system of the present invention.

Referring first to FIG. 1, there is shown a general arrangement of a hydraulically-operated anti-skid brake system for a motor vehicle. The brake system includes anti-skid devices of a closed-circuit type. In the figure, reference numeral 10 designates a brake pedal which is connected to a master cylinder 14 through a brake booster 12. The master cylinder 14 is of a tandem type, having two mutually independent pressure chamber. One of the pressure chambers is connected to an actuator 18 through a passage 16, and is further connecte dto a front left brake cylinder 26 for a front left wheel 24 of the vehicle via a passage 20, and to a rear right brake cylinder 30 for a rear right wheel 28 of the vehicle via a passage 22. The other pressure chamber of the master cylinder 14 is connected to the actuator 18 through a passage 32, and is further connected to a front right brake cylinder 40 for a front right wheel 38 via a passage 34, and to a rear left brake cylinder 44 for a rear left wheel 42 via a passage 36. The passages 16, 20, 22, 32, 34, 36 constitute a major part of a main fluid passage through which the master cylinder 14 communicates with the four brake cylinders 26, 30, 40, 44. The instant arrangement of connection of the brake cylinders is generally called "diagonal piping" wherein the front left and rear right brake cylinders 26, 30 are connected to each other while the front right and rear left brake cylinders 40, 44 are connected to each other. The passages 22, 36 are preferably provided with proportioning valves (not shown).

The actuator 18 has a pressure control device which includes cut-off valves 50, 52, 54, 56 corresponding to the brake cylinders 26, 40, 30, 44, and corresponding by-pass valves 58, 60, 62, 64. The cut-off valve 50 has a ball 70 which is biased by a spring 66 so as to be seated on a valve seat 68, and a piston 72 which is adapted to move the ball 70 away from the valve seat 68. The piston 72 is movable between its retracted and advanced positions, by a pressure differential between two pressure chambers 74, 76 formed on opposite sides thereof. With the piston 72 moved to its retracted position, the ball 70 is permitted to be seated on the valve seat 68 whereby the volume of the pressure chamber 74 is increased. In the advance position, the piston 72 reduces the volume of the pressure chamber 74 and holds the ball 70 away from the valve seat 68. The pressure chamber 74 communicates with the passage 20 through a passage 78. The by-pass valve 58 has a ball 84 which is biased by the spring 66 so as to be moved away from a valve seat 80 and toward a valve seat 82, and a piston 86 which is adapted to move the ball 84 against the valve seat 80. As long as pressure exists in a pressure chamber 88, the piston 86 holds the ball 84 seated on the valve seat 80, and maintains fluid communication between the pressure chamber 74 and the front left brake cylinder 26. When no pressure exists in the pressure chamber 88, the ball 84 is separated from the valve seat 80, permitting a pressurized brake fluid from the master cylinder 14 to be fed toward the brake cylinder 26 while by-passing the cut-off valve 50. While the cut-off valve 50 and the by-pass valve 58 have been described above, the other cut-off valves 52, 54, 56 and the other by-pass valves 60, 62, 64 have the same construction as the cut-off and by-pass valves 50 and 58, respectively.

The pressure chamber 88 is directly connected to a control valve 102 by a passage 100, while the pressure chamber 76 is connected to the control valve 102 via a solenoid-operated pressure control valve 104, a passage 106 and the passage 100. The cut-off valve 52 corresponding to the front right brake cylinder 40 for the front right wheel 38 is connected to the control valve 102 via another solenoid-operated pressure control valve 108. However, the cut-off valves 54 and 56 corresponding to the brake cylinders 30, 44 for the rear left and right wheels 28, 42 are connected to the control valve 102 via a common solenoid-operated pressure control valve 110.

The solenoid-operated pressure control valves 104, 108 and 110 are adapted to control the pressures in the pressure chamber 76 of the cut-off valve 50, and in the pressures in the corresponding pressure chambers (no reference numerals given) of the other cut-off valves 52, 54, 56. More specifically, the pressure control valves 104, 108, 110 are operated to feed a fluid from the control valve 102 to the pressure chamber 76, etc., or permit the fluid in these pressure chambers to be discharged into a reservoir 114. Since the pressure control valves 104, 108, 110 are valves well known in the art, no further description thereof is deemed necessary. The solenoid operated pressure control valve 104, 108, and 110 cooperates with the cut-off valve 50, 52, 54, 56 and the by-pass valve 58, 60, 62, 64 to constitute the previously discussed pressure control device.

The fluid in the reservoir 114 is pumped up by a pump 120 and reserved in an accumulator 122. The control valve 102 is operated to adjust the pressure of the fluid from the accumulator 122 to a level higher than that in the master cylinder 14, and to apply the adjusted fluid pressure to the solenoid-operated pressure control valve 104, etc. For this purpose, the control valve 102 is connected to the master cylinder passage 16 by a passage 124. Further, the control valve 102 is connected to the reservoir 114 by a passage 126 and the passage 112 previously indicated.

Figure 2:
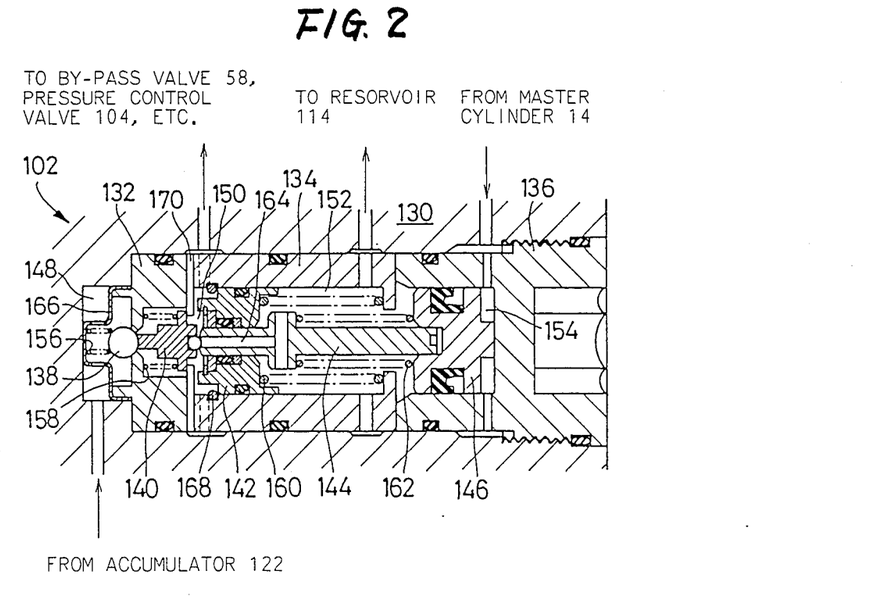
FIG. 2 is a front elevational view in corss section of a control valve used in the anti-skid brake system of FIG. 1.

As shown in FIG. 2, the control valve 102 has a valve-seat member 132, a cylinder 134 and a plug 136 which are received in a housing 130 of the actuator 18. Within these members 132, 134, 136, there are disposed: a ball 138; a valving member 140 having a valve portion in the form of a ball; a piston 142 having a central bore; a rod 144 slidably and fluid-tightly received in the central bore in the piston 142; and a piston 146 axially slidably engaging an end portion of the rod 144 such that the rod 144 is abuttable at its end on the piston 146. The components indicated above cooperate with each other to define four pressure chambers 148, 150, 152 and 154. The pressure chamber 148 communicates with the accumulator 122. The pressure chamber 150 communicates with the by-pass valve 58, solenoid-operated pressure control valve 104, etc. The pressure chambers 152 and 154 communicate with the reservoir 114 and the master cylinder 14, respectively.

The ball 138, valving member 140, piston 142, rod 144 and piston 146 are normally held in their positions indicated in FIG. 2, by springs 156, 158, 160 and 162, respectively. The pressure chambers 148 and 150 are disconnected with the ball 138 seated on the valve-seat member 132, while the pressure chambers 150 and 152 are disconnected with the valve portion of the valving member 140 closing a communication passage 164 formed in the rod 144. When the braking pressure in the master cylinder 14 is applied to the pressure chamber 154, the piston 146 is advanced to move the rod 144 to the left (in FIG. 2), thereby moving the valving member 140 and ball 138 in the same direction, whereby the pressure chambers 148, 150 are brought into communication with each other. As a result, the high-pressure fluid in the pressure chamber 148 is fed into the pressure chamber 150 so as to raise the pressure in the pressure chamber 150. Accordingly, the piston 142 is moved to the right (to its retracted position) against a biasing action of the spring 160, while moving the rod 144 and the piston 146 to their retracted positions. Consequently, the ball 138 is seated on the valve-seat member 132, and the communication of the pressure chambers 148, 150 is broken. When the piston 142 is moved a further distance in the right direction, the valving member 140 comes into abutment on a stopper 170, whereby the rod 144 is moved away from the valving member 140, permitting the pressure chamber 150 to communicate with the pressure chamber 152 through the passage 164. Consequently, the fluid is fed from the pressure chamber 150 toward the reservoir 114, and therefore the pressure in the chamber 150 is lowered.

With the above operation repeated, the pressure in the pressure chamber 150 is regulated by the pressure of the master cylinder 14 applied to the pressure chamber 154. In the present embodiment, the pistons 142 and 146 have the same diameter, and the piston 142 must move against the biasing force of the spring 60 in order to move the rod 144 away from the valving member 140 and to thereby place the two pressure chambers 150 and 152 into communication. Hence, the pressure in the pressure chamber 150 is held slightly higher than that in the pressure chamber 154. In other words, the pressure of the fluid to be delivered from the pressure chamber 150 to the by-pass valve 58, pressure control valve 104, etc. is controlled to be slightly higher than the pressure of the master cylinder 14 applied to the pressure chamber 154. Reference numeral 166 indicates a spring retainer, while reference numeral 168 indicates a stopper ring for determing the forward stroke end of the piston 142.

As is apparent from FIG. 1, the solenoid-operated pressure control valves 104, 108, 110 are operated under the control of a control device 180. This control device 180, whose major part is constituted by a computer, is adapted to receive signals from speed sensors 182, 184, 186, 188 which are disposed to detect slippage of the wheels 24, 28, 38, 42 of the vehicle. The control device 180 calculates a slip ratio of each wheel based on the signals from these speed sensors 182, 184, 186, 188, and controls the pressure control valves 104, 108, 110 so as to hold the slip ratio of each wheel within an optimum range. Since the manner of controlling the pressure control valves 104, 108, 110 is well known in the art, no detailed description thereof will be provided herein. The control device 180 also serves to turn on and off an electric drive motor 192 for operating the pump 120, based on a signal from a pressure switch 190 provided in the accumulator 122, so that the pressure in the accumulator 122 is held within a predetermined range. The control device 180 functions as a main controller for controlling the operation of the actuator 18, and cooperates with the actuator 18 to provide the previously indicated anti-skid devices of a closed-circuit or variable-volume type.

A solenoid-operated valve 200 is provided in the passage 16 between the master cylinder 14 and the actuator 18. Similarly, a solenoid-operated valve 202 is provided in the passage 32. The solenoid-operated valve 200 is normally placed in its non-activated or fully-open position (right-hand side position indicated in FIG. 1) in which the brake fluid is allowed to flow through the passage 16 without any restriction. When a solenoid 204 of the valve 200 is energized, the valve 200 is switched into its activated or restricting position (left-hand side position in FIG. 1) in which the flow of the brake fluid through the passage 16 is restricted. Similarly, the solenoid-operated valve 202 is operable between its fully-open and restricting positions through energization and deenergization of its solenoid 206, to permit a non-restricted or restricted flow of the fluid through the passage 32. Thus, these solenoid-operated valves 200 and 202 serve as flow restrictor devices for restricting the flows of the fluid through the passages 16, 32, as needed.

The solenoid-operated valves 200, 202 are controlled by the control device 180. As indicated in the flow chart of FIG. 4 by way of an example, when an anti-skid control of the braking pressure in one of the front right and left brake cylinders 26, 40 is started, the solenoid-operated valve 200, 202 corresponding to the other brake cylinder 26, 40 is activated, i.e., placed in its activated or restricting position. Therefore, the control device 180 functions to control the flow restrictor devices in the form of the solenoid-operated valves 200, 202.

Figure 4:
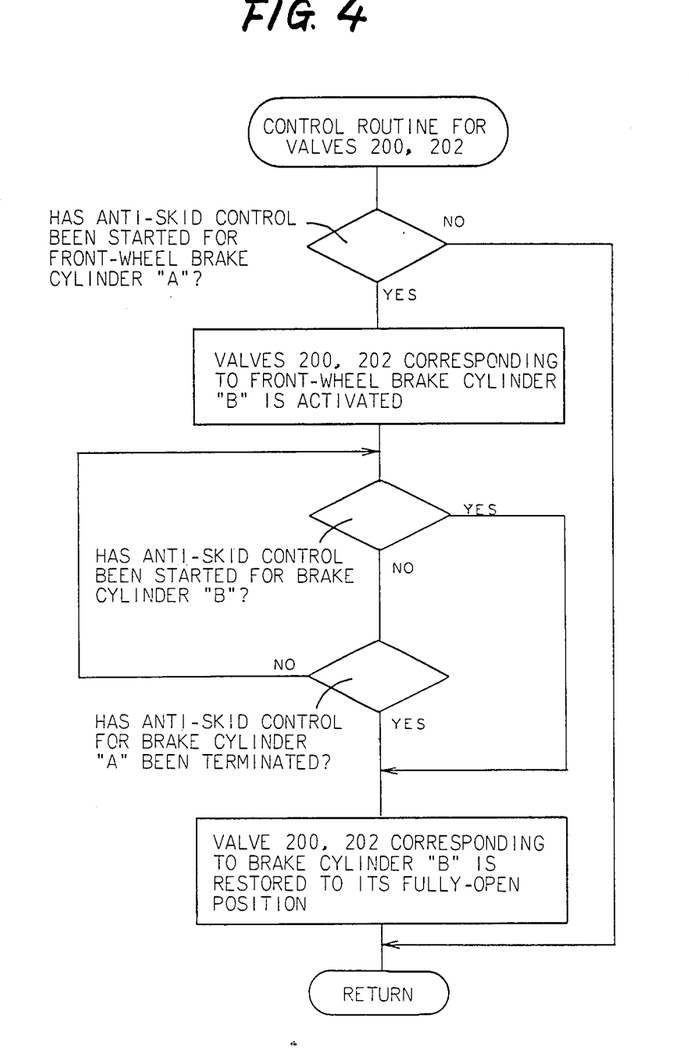
FIGS. 4, 5 and 6 are flow charts illustrating control programs used for controlling the brake system.

There will be described in more detail the operation of the instant anti-skid brake system which occurs when brake is applied while the vehicle is running with its right wheels 28, 38 on a road surface having a comparatively low coefficient of friction. In this specific example, the front-wheel brake cylinder A in FIG. 4 is the front right brake cylinder 38, while the other front-wheel brake cylinder B is the front left brake cylinder 24.

Upon depression of the brake pedal 10, fluid pressure is developed in the master cylinder 14, and is applied to all of the four brake cylinders 26, 30, 40, 44. At the same time, the fluid pressure is applied to the control valve 102. In response to this pressure of the master cylinder 14, the control valve 102 is operated to adjust the high-pressure fluid from the accumulator 122, to a pressure level slightly higher than the pressure in the master cylinder 14. The control valve 102 applies the adjusted pressure to the by-pass valves 58, 60, 62, 64, whereby these by-pass valves are closed. The pressur adjusted by the control valve 102 is also applied to the solenoid-operated pressure control valves 104, 108, 110. However, these control valves will not operate to effect an anti-skid control of the braking pressure in the brake cylinders 26, 30, 40, 44, until the depression of the brake pedal 10 exceeds a given amount. Namely, the pressure as developed in the master cylinder 14 is exerted to the brake cylinders 26, 30, 40, 44.

When the amount of depression or depressing force of the brake pedal 10 exceeds a certain limit, the slip ratio of the front and rear right wheels 38, 28 running on the low friction-coefficient road surface falls outside a predetermined optimum range. Consequently, the control device 180 starts to control the solenoid-operated pressure control valve 108 or 110, so as to effect an anti-skid control of the braking pressure. In this connection, it is noted that the present embodiment is adapted such that the solenoid-operated valves 200, 202, which form an important part of the brake system of the invention, remain in their non-activated or fully-open position, even after the anti-skid control is started for the rear-wheel brake cylinders 30, 44. Therefore, the following description refers to the operation of the brake system when the anti-skid control for the front right brake cylinder 40 (for the front right wheel 38) is started.

Figure 3:
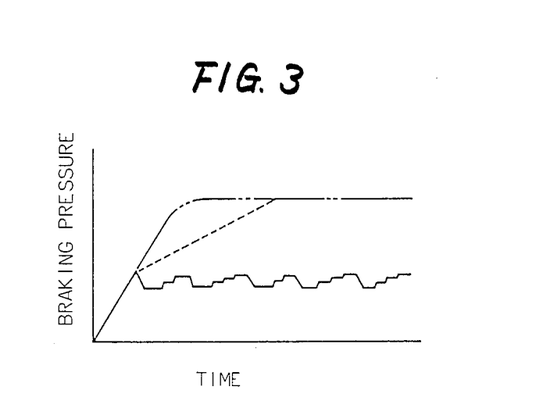
FIG. 3 is a graphical representation indicating a change in braking pressure in the brake system of FIG. 1.

When the solenoid-operated pressure control valve 108 corresponding to the front right wheel 38 is activated to start its anti-skid control operation, the braking pressure in the corresponding brake cylinder 40 is regulated as indicated in solid line in FIG. 3, as well known in the art. Simultaneously, the control device 180 energizes the solenoid 204 of the solenoid-operated valve 200, in order to restrict the flow of the brake fluid through the passage 16 toward the brake cylinder 26 for the front left wheel 24. As a result, the rate of increase in the braking pressure in the brake cylinder 26 is reduced, as indicated in dotted line in FIG. 3. Suppose the solenoid-operated valve 200 was not provided, the braking pressure in the brake cylinder 26 would rise at a higher rate, as indicated in two-dot chain line in FIG. 3. In this event, the braking force applied to the front left wheel 24 is considerably larger, than the braking force applied to the front right wheel 38, which is restrained by the anti-skid control of the braking pressure in the brake cylinder 40. As a result, the vehicle tends to turn left, and the operator feels, through the steering wheel, a drag of the vehicle on its left side. Thus, the straight-line running stability and controllability of the vehicle are reduced. In the present embodiment of the invention, on the contrary, the restriction of the fluid flow through the solenoid-operated valve 200 in the passage 16 effectively lowers the rate of rise in the braking pressure in the front left brake cylinder 26, thereby restraining the above-indicated left-turn tendency of the vehicle. Hence, the instant arrangement enables the vehicle operator to maneuver the vehicle with high straight-line running stability.

Figure 5:
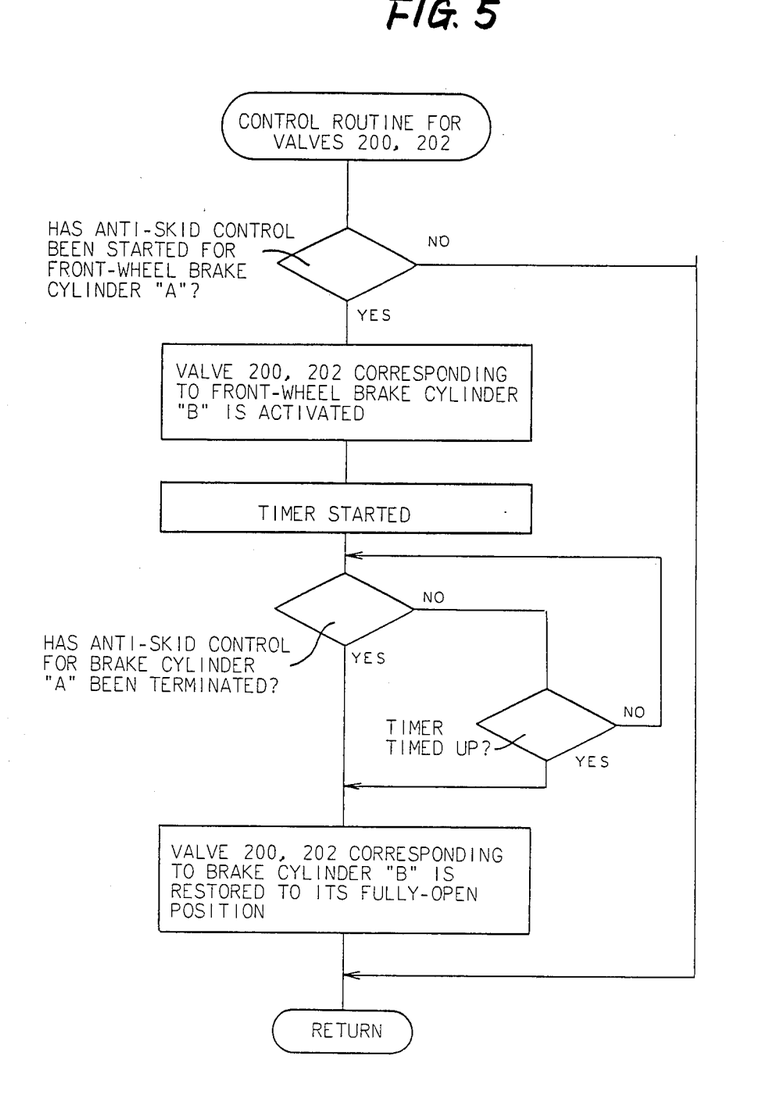

When the braking pressure in the front left brake cylinder 26 has been raised to a level at which the slip ratio of the front left wheel 24 becomes outside the optimum range, the anti-skid control is commenced also for the brake cylinder 26. At this time, the control device 180 deenergizes the solenoid 204 of the solenoid-operated valve 200, in order to restore the valve 200 to its non-activated or fully-open position, that is, to fully open the passage 16, as indicated in FIG. 4. As long as the slip ratio of the front left wheel 24 is held within the optimum range, the solenoid-operated valve 200 remains in its activated position, until the anti-skid control of the pressure in the brake cylinder 40 for the front right wheel 38 is terminated, as also indicated in FIG. 4. However, it is possible that the solenoid-operated valve 200 may be restored to its non-activated fully-open position a predetermined time after the start of the anti-skid control for the brake cylinder 26, even while the slip ratio of the front left wheel 24 is held within the optimum range, as indicated in the flow chart of FIG. 5. This predetermined time is determined so as to allow a sufficient time for the operator to attend to the left-turn tendency of the vehicle due to a drag on its left side. It is further possible that once the solenoid-operated valve 200 has been activated, the valve 200 is held in its activated position even after the anti-skid control is started for the front left brake cylinder 26. In this case, the valve 200 is restored to its fully-open position when the anti-skid control for the brake cylinder 26 is terminated.

Although the present embodiment is adapted to restrict the rate of increase in the brake cylinder 30 for the rear right wheel 28, as well as the rate of increase in the brake cylinder 26, upon activation of the solenoid-operated valve 200, it is possible to avoid the restriction in connection with the brake cylinder 30, by locating the valve 200 in a part 16a of the passage 16. Described more particularly, the passage 16 is split into the part 16a leading to the cut-off valve 50, and a part 16b leading to the cut-off valve 54. In this case, the piping connection is more or less complicated.

Figure 6:
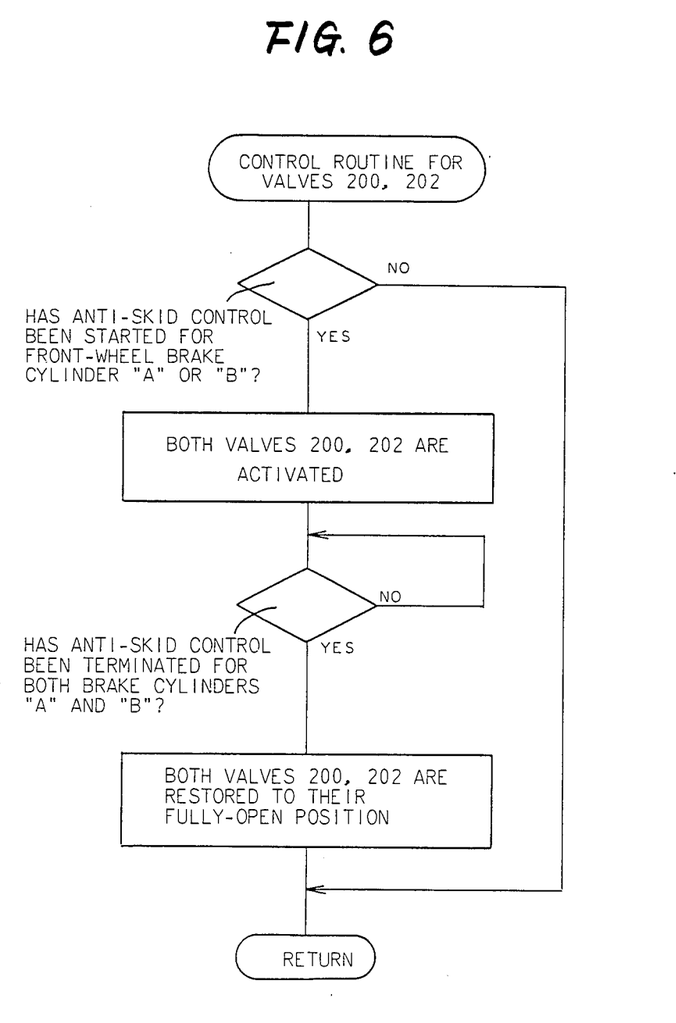

Further, the instant embodiment may be modified such that when the anti-skid control is started for one of the front-wheel brake cylinders 26, 40, both of the solenoid-operated valves 200, 202 are activated so as to restrict the rates of increase in the braking pressures in the front- and rear-wheel cylinders on the side opposite to the above-indicated one front-wheel cylinder, as indicated in the flow chart of FIG. 6. This arrangement will not influence the anti-skid control of the above one front-wheel cylinder.

Figure 7:
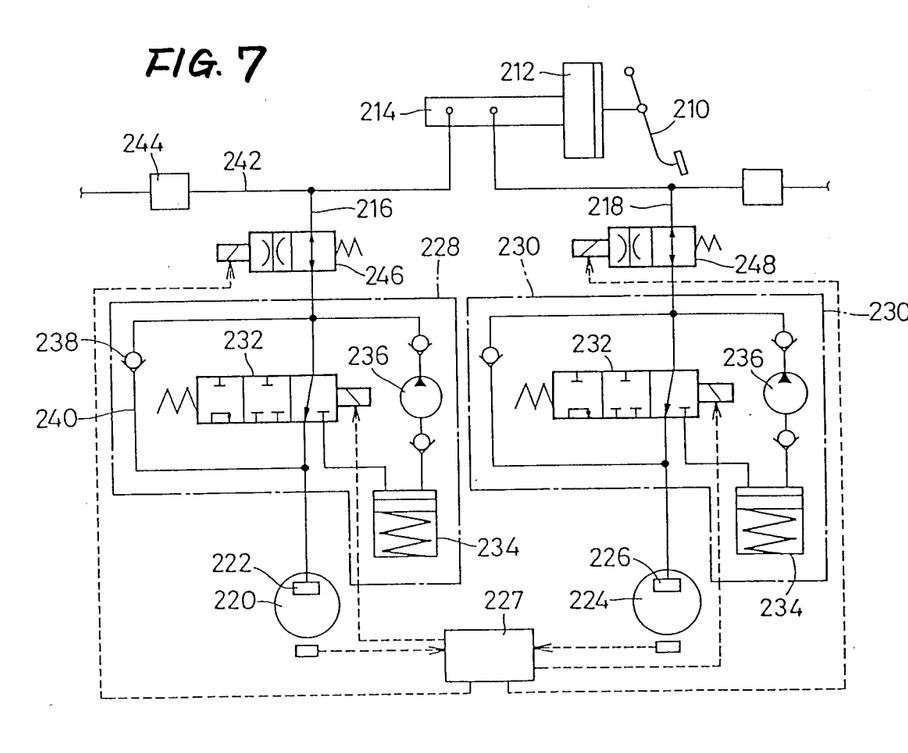
FIG. 7 is a diagram illustrating a modified embodiment of the anti-skid brake system of the invention.

Referring next to FIG. 7, there will be shown another embodiment of the brake system of the invention which includes anti-skid devices of a recirculating type. In this embodiment, too, an operating force of a brake pedal 210 is exerted via a brake booster 212 to a master cylinder 214. Fluid pressures developed in two pressure chambers of the master cylinder 214 are applied through passages 216, 218 to brake cylinders 222, 226 for front left and right wheels 220, 224 of the vehicle, respectively, as in the preceding embodiment. However, the instant embodiment is different from the preceding embodiment in the arrangement of the anti-skid devices and in the location of flow restrictor devices.

The anti-skid devices comprise a control device 227 whose major part is constituted by a computer, and pressure regulating circuits 228, 230. The pressure regulating circuit 228 includes a solenoid-operated pressure regulating valve 232 which has three positions: a PRESSURE-RISE position in which the brake cylinder 222 communicates with the master cylinder 214; a PRESSURE-FALL position in which the brake cylinder 222 communicates with a reservoir 234; and a PRESSURE-HOLD position in which the brake cylinder 222 is disconnected from both of the master cylinder 214 and the reservoir 234. The brake fluid discharged from the brake cylinder 222 is reserved in the reservoir 234, and the reserved fluid is pumped by a pump 236 so as to be recirculated into the passage 216. The pressure regulating circuit further has a by-pass passage 240 which by-passes the pressure regulating valve 232. The by-pass passage 240 incorporates a check valve 238.

The passage 216 is connected to a brake cylinder (not shown) for a rear right wheel, through a passage 242 in which a proportioning valve 244 is provided. As indicated in FIG. 7, a solenoid-operated valve 246 is located in a part of the passage 216 between the point of connection with the passage 242, and the pressure regulating valve 232. Since this solenoid-operated valve 246 is similar to the solenoid-operated valve 200 of the preceding embodiment, no detailed description thereof will be given herein. The pressure regulating circuit 230 and another solenoid-operated valve 248 are similar to the circuit 228 and the valve 246.

When brake is applied so as to activate the anti-skid devices while the vehicle is running with their right and left wheels contacting road surfaces having different coefficients of friction, the solenoid-operated valves 246, 248 are operated to attain control functions similar to those performed by the solenoid-operated valves 200, 202 of the preceding embodiment. For example, if the front left wheel 220 runs on the road surface having a higher friction coefficient than that of the road surface on which the front right wheel 224 runs, the slip ratio of the front right wheel 224 exceeds a permissible limit before the slip ratio of the front left wheel 220 exceeds the limit. Therefore, the braking pressure in the brake cylinder 226 is controlled as indicated in solid line in FIG. 3. At the same time, the solenoid-operated valve 246 is activated in order to restrict the rate of rise in the braking pressure in the brake cylinder 222, as indicated in dotted line in FIG. 3.

While the anti-skid devices of recirculating type used in the present modified embodiment are schematically illustrated in FIG. 7 in the interest of brevity and easy understanding, various other valves are actually incorporated therein for improved operating characteristics. It is to be understood that the concept of the present invention is applied to such a brake system with additional valves.

Although the illustrated embodiments of the invention employ flow restrictor devices in the form of the solenoid-operated valves 200/202 or 246/248 that are exclusively designed for restricting flows of the fluid through the passages 16/32 or 216/218, it is possible to utilize the pressure regulating valves 232 of the anti-skid devices of FIG. 7 as flow restrictor devices. In this instance, the solenoid-operated valves 246, 248 are eliminated, and the control device 227 is modified so as to control the pressure regulating valves 232 in a special mode when necessary.

Figure 8:
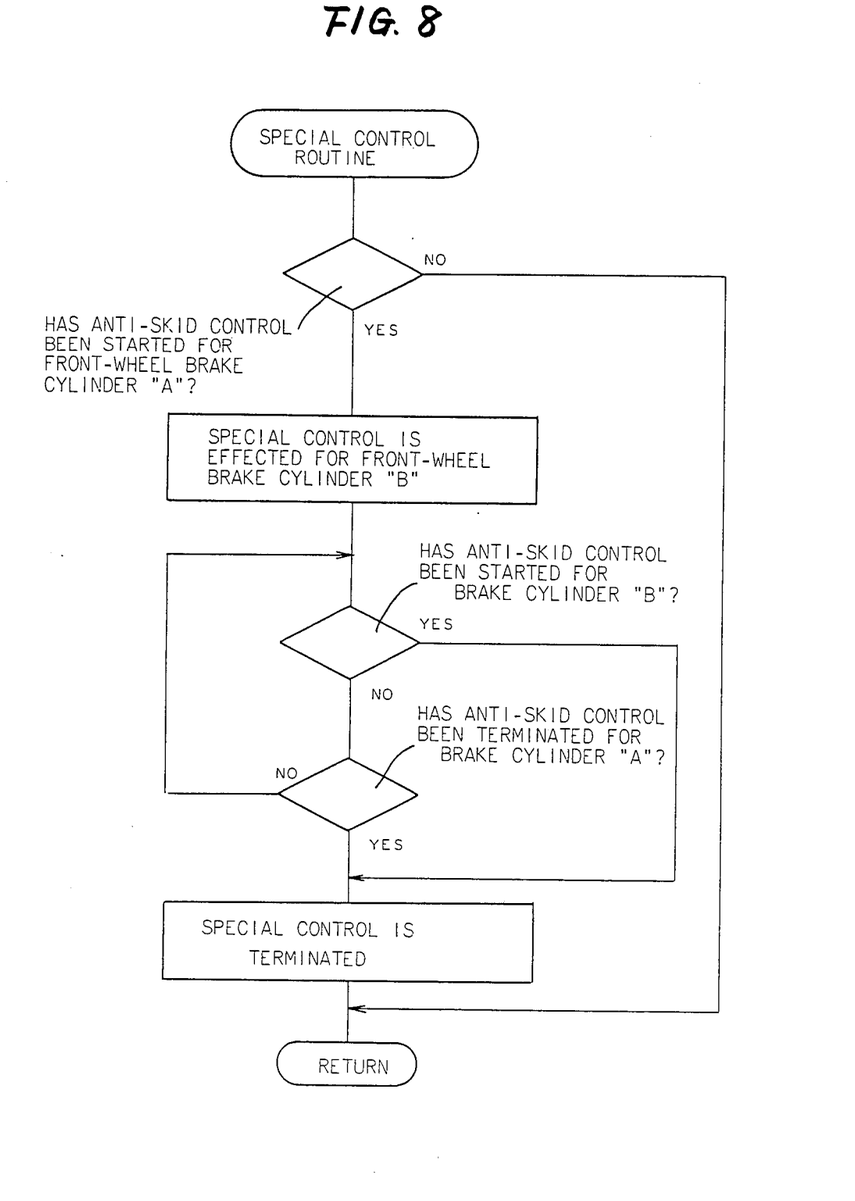
FIG. 8 is a flow chart showing a control program used in a further embodiment of the invention.

The above-indicated modification of the embodiment of FIG. 7 will be described in more detail, referring to the flow chart of FIG. 8. As soon as the anti-skid control has been started for one of the front-wheel brake cylinders (hereinafter referred to as "brake cylinder A"), a special control is effected for the other front-wheel brake cylinder (hereinafter referred to as "brake cylinder B"). Namely, the braking pressure in the brake cylinder A is controlled as indicated in thin solid line in FIG. 9, while the braking pressure in the brake cylinder B is controlled in a special mode wherein the corresponding pressure regulating valve of the anti-skid device is operated so as to raise and hold the braking pressure in an alternate fashion. The rate of increase in the braking pressure in the brake cylinder B is thus restricted as indicated in thick solid line in FIG. 9. This special mode of control of the braking pressure in the brake cylinder B is terminated when the anti-skid control is started for the brake cylinder B for the front wheel running on the road surface having a comparatively high coefficient of friction, or alternatively when the anti-skid control is terminated for the brake cylinder A for the front wheel running on the road surface having a comparatively low coefficient of friction.

Figure 9:
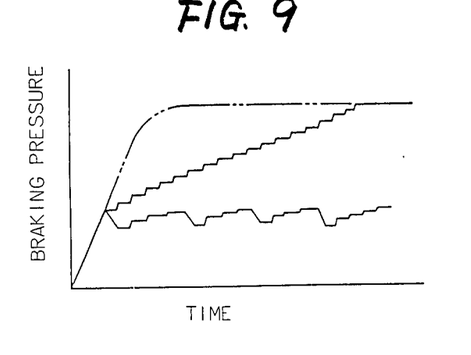
FIG. 9 is a graphical representation indicating a change in braking pressure in the embodiment of FIG. 8.
Figure 10:
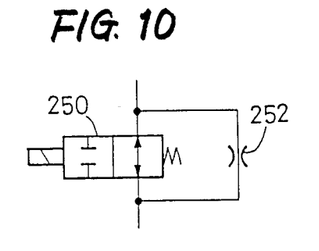
FIG. 10 and 11 are diagrams showing solenoid-operated flow restrictor devices used in further embodiments of the invention.
Figure 11:
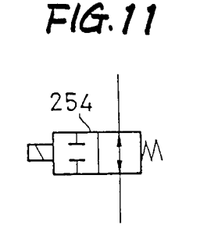

Further modifications of the invention are possible. For instance, the flow restrictor device for controlling the braking pressure as shown in FIG. 3 may be constituted by a solenoid-operated shut-off valve 250 and a restrictor 252 connected in parallel to the shut-off valve 250, as indicated in FIG. 10. The shut-off valve 250 is operable between a closed and an open position under the control of the control device, so that the flow of the fluid through the restrictor device is restricted by the restrictor 252 when the shut-off valve 250 is placed in its closed position. FIG. 11 illustrates another modification of the flow restrictor device, which uses a solenoid-operated shut-off valve 254 that is normally held in its open position. When the flow restriction is required, the control device applies current pulses to the shut-off valve 254 so as to place the valve 254 alternately in the open and closed positions at a relatively high frequency, that is, at a desired duty cycle. In this case, the rise of the braking pressure is restricted as indicated in FIG. 9. Further, the flow restrictor device may be controlled by a control device which is different from the main controller for the anti-skid devices. It is also possible to use the flow restrictor devices described above for front-wheel brake cylinders in other types of anti-skid brake system, for example, in a brake system wherein the front right and left brake cylinders are connected to one of the two pressure chambers of the master cylinder while the rear right and left brake cylinders are connected to the other pressure chamber. In the case where the anti-skid devices control the rear right and left brake cylinders independently of each other, the flow restrictor devices of the invention may be provided for the rear brake cylinders.

While the present invention has been described in its preferred embodiments with a certain degree of particularity, for illustrative purpose only, it is to be understood that the invention may be embodied with other changes, modifications and improvements which may occur to those skilled in the art, without departing from the spirit and scope of the invention defined in the appended claims.

What is claimed is:

1. A hydraulic brake system wherein braking pressures in respective right and left brake cylinders for a right wheel and a left wheel of a motor vehicle are regulated to prevent skidding, comprising:
 a master cylinder operable for generating a master cylinder pressure;
 a first passage and a second passage, said first and second passages connecting said master cylinder to said right and left brake cylinders, respectively;
 a first pressure control device and a second pressure control device, said first and second pressure control devices being of a closed-circuit type, each of said first and second pressure control devices comprising:
 (a) a cut-off valve disposed in a part of each of said first and second passages, said cut-off valve being operable between an open position and a closed position;
 (b) a variable-volume chamber communicating with a respective one of said first and second passages, at a point between said cut-off valve and a respective one of said first and second brake cylinders;
 (c) an actuator partially defining said variable-volume chamber, said actuator being movable so as to selectively open and close said cut-off valve and sod as to change the volume of said variable-volume chamber thereby changing the braking pressure in said one of said right and left brake cylinders while said cut-off valve is placed in said closed position;
 (d) a pressure chamber partially defined by said actuator such that pressure in said pressure chamber acts on said actuator so as to reduce the volume of said variable-volume chamber;

(e) a solenoid-operated valve connected to said pressure chamber, said solenoid operated valve being operable between a first position wherein the pressure in said pressure chamber may be reduced, and a second position wherein the pressure in said pressure chamber may increase; and (f) a power source independent of said master cylinder to activate said actuator through said solenoid-operated valve;

a first flow restrictor device provided in said first passage, a second flow restrictor device provided in said second passage, said first and second flow restrictor devices being electrically controlled independently of each other, so as to restrict the flow of a brake fluid from said master cylinder to said right and left brake cylinders through said first and second passages, respectively, and control means electrically connected to said solenoid-operated valves of said first and second pressure control devices and to said first and second flow restrictor devices, said control means being operable to activate one of said first and second flow restrictor devices which corresponds to one of said right and left brake cylinders, after the pressure control device for the other brake cylinder is activated to start an anti-skid control of the braking pressure in the other one of said right and left brake cylinder upon skidding of the corresponding wheel, said control means controlling said one flow restrictor device to thereby reduce the rate of increase in the braking pressure in said one brake cylinder after said anti-skid control of the braking pressure in said other brake cylinder is started.

2. A hydraulic brake system according to claim 1, wherein said control device restores said one flow restrictor device to a non-activated position thereof when the pressure control device for said one brake cylinder is activated to effect an anti-skid control of the braking pressure in said one brake cylinder.

3. A hydraulic brake system according to claim 1, wherein said control devices restore said one flow restrictor device to a non-activated position thereof when said anti-skid control of said braking pressure in said other brake cylinder is terminated.

4. A hydraulic brake system according to claim 1, wherein said control device restores said one flow restrictor device to a non-activated position thereof when a predetermined time has lapsed after said anti-skid control of the braking pressure in said other brake cylinder is started.

5. A hydraulic brake system according to claim 1, wherein said control device simultaneously activates both said first and second flow restrictor devices when said anti-skid control of said braking pressure in said other brake cylinder is started.

6. A hydraulic brake system according to claim 1, wherein each of said first and second flow restrictor device comprises restrictor valve means having a non-restricting position in which the flow of said brake fluid through the corresponding one of said first and second passages, and a restricting position in which said flow is restricted, said restrictor valve means being normally held in said non-restricting position by said control device.

7. A hydraulic brake system according to claim 6, wherein said restrictor valve means is a solenoid-operated valve which is operable between said non-restricting and restricting positions under the control of said control device.

8. A hydraulic brake system according to claim 6, wherein said restrictor valve means includes a solenoid-operated shut-off valve operable between a closed and an open position under the control of said control device, and further includes a restrictor connected in parallel to said solenoid-operated shut-off valve, the flow of said brake fluid through said corresponding one of said first and second passages being restricted by said restrictor when said shut-off valve is placed in said closed position.

9. A hydraulic brake system according to claim 6, wherein said restrictor valve means is a solenoid-operated shut-off valve operable between a closed and an open position, said control device normally holding said shut-off valve in said open position, but applying current pulses to said shut-off valve to bring said shut-off valve alternately into said open and closed positions, thereby restricting the flow of said brake fluid through said corresponding one of said first and second passages, when said pressure control device for said other brake cylinder is activated to start the anti-skid control of the braking pressure in said other brake cylinder.

* * * * *